US008898660B2

(12) United States Patent
Hieb et al.

(10) Patent No.: US 8,898,660 B2
(45) Date of Patent: Nov. 25, 2014

(54) SYSTEMS AND METHODS TO PROVIDE CUSTOMIZED RELEASE NOTES DURING A SOFTWARE SYSTEM UPGRADE OF A PROCESS CONTROL SYSTEM

(75) Inventors: Brandon Hieb, Cedar Park, TX (US); David R. Denison, Austin, TX (US); Ram Ramachandran, Austin, TX (US); Hubbard Fellows, Round Rock, TX (US); Margaret M. Carpenter, legal representative, Cypress, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 1294 days.

(21) Appl. No.: 12/323,007

(22) Filed: Nov. 25, 2008

(65) Prior Publication Data

US 2010/0131939 A1 May 27, 2010

(51) Int. Cl.
G06F 9/445 (2006.01)
G06F 9/44 (2006.01)

(52) U.S. Cl.
CPC ....................... *G06F 8/73* (2013.01)
USPC .......................... 717/174; 717/175

(58) Field of Classification Search
None
See application file for complete search history.

(56) References Cited

U.S. PATENT DOCUMENTS

| | | | |
|---|---|---|---|
| 5,826,080 A | 10/1998 | Dworzecki | |
| 5,913,066 A | 6/1999 | Benzenberg et al. | |
| 6,078,747 A | 6/2000 | Jewitt | |
| 6,272,508 B1 * | 8/2001 | Dyne et al. | 715/210 |
| 6,282,709 B1 | 8/2001 | Reha et al. | |
| 6,397,385 B1 | 5/2002 | Kravitz | |
| 6,457,076 B1 | 9/2002 | Cheng et al. | |
| 6,557,054 B2 | 4/2003 | Reisman | |
| 6,571,285 B1 | 5/2003 | Groath et al. | |
| 6,633,782 B1 | 10/2003 | Schleiss et al. | |
| 6,654,645 B2 | 11/2003 | Bermann et al. | |
| 6,681,226 B2 | 1/2004 | Bretl et al. | |

(Continued)

FOREIGN PATENT DOCUMENTS

| | | |
|---|---|---|
| CN | 1525271 | 9/2004 |
| CN | 1859191 | 11/2006 |

(Continued)

OTHER PUBLICATIONS

Search Report, issued by the UK Patent Office on Mar. 4, 2010, in connection with Great Britain Application No. 0919725.2, 3 pages.

(Continued)

*Primary Examiner* — Qamrun Nahar
(74) *Attorney, Agent, or Firm* — Hanley, Flight & Zimmerman, LLC

(57) ABSTRACT

An example customized documentation generation apparatus is disclosed that generates documents relevant to a software update/upgrade of a particular process control system. A notes instrumentation module instruments general release notes for at least one of an update or an upgrade of a process control system to correlate the release notes with a general process control system configuration to produce instrumented notes. An upgrade assessment module determines configuration information for a particular process control system to provide default filter settings. An items of interest filter applies the default filter settings for the particular process control system to the instrumented notes to filter the instrumented notes and produce custom release notes for the particular process control system. The custom release notes are provided to a user to alert the user regarding potential effects of the update/upgrade on the particular process control system.

23 Claims, 7 Drawing Sheets

(56) References Cited

U.S. PATENT DOCUMENTS

| | | |
|---|---|---|
| 6,711,557 B1 | 3/2004 | Palaniappan |
| 6,732,358 B1 | 5/2004 | Siefert |
| 6,801,920 B1 | 10/2004 | Wischinski |
| 6,813,532 B2 | 11/2004 | Eryurek et al. |
| 6,931,328 B2 | 8/2005 | Braig et al. |
| 6,965,806 B2 | 11/2005 | Eryurek et al. |
| 6,973,479 B2 | 12/2005 | Brady, Jr. et al. |
| 6,985,779 B2 | 1/2006 | Hsiung et al. |
| 6,990,660 B2 | 1/2006 | Moshir et al. |
| 6,996,818 B2 | 2/2006 | Jacobi et al. |
| 7,020,875 B2 | 3/2006 | Zweifel et al. |
| 7,080,371 B1 | 7/2006 | Arnaiz et al. |
| 7,093,246 B2 | 8/2006 | Brown et al. |
| 7,120,391 B2 | 10/2006 | Stengele et al. |
| 7,130,701 B1 | 10/2006 | Wischinski |
| 7,178,056 B2 | 2/2007 | Shanbhogue |
| 7,203,560 B1 | 4/2007 | Wylie et al. |
| 7,239,977 B2 | 7/2007 | Fantana et al. |
| 7,328,078 B2 | 2/2008 | Sanford et al. |
| 7,346,404 B2 | 3/2008 | Eryurek et al. |
| 7,386,845 B1 | 6/2008 | Fox et al. |
| 7,496,910 B2 | 2/2009 | Voskuil |
| 7,516,450 B2 | 4/2009 | Ogura |
| 7,539,686 B2 | 5/2009 | Shepard et al. |
| 7,546,594 B2 | 6/2009 | McGuire et al. |
| 7,644,404 B2 | 1/2010 | Rao et al. |
| 7,698,242 B2 | 4/2010 | Van Camp et al. |
| 7,747,995 B2 | 6/2010 | Fritsch et al. |
| 7,747,997 B1 | 6/2010 | Rao |
| 7,784,044 B2 | 8/2010 | Buban et al. |
| 7,814,476 B2 | 10/2010 | Ho |
| 7,814,480 B2 | 10/2010 | Sakuda et al. |
| 7,818,405 B2 | 10/2010 | Appaji |
| 7,831,412 B1 | 11/2010 | Sobel et al. |
| 7,844,766 B1 | 11/2010 | Straitiff |
| 7,865,889 B1 | 1/2011 | Bird et al. |
| 7,895,592 B2 | 2/2011 | Subramanian et al. |
| 7,966,278 B1 | 6/2011 | Satish |
| 8,176,483 B2 | 5/2012 | Hoefler et al. |
| 8,473,940 B2 | 6/2013 | Ikeda |
| 8,490,075 B2 | 7/2013 | Waris et al. |
| 8,665,466 B2 | 3/2014 | Akiyoshi |
| 2002/0046221 A1 | 4/2002 | Wallace et al. |
| 2002/0095230 A1 | 7/2002 | Bergo et al. |
| 2002/0163427 A1 | 11/2002 | Eryurek et al. |
| 2002/0174264 A1 | 11/2002 | Fuller et al. |
| 2003/0182652 A1 | 9/2003 | Custodio |
| 2004/0088698 A1 | 5/2004 | Claiborne |
| 2004/0088699 A1 | 5/2004 | Suresh |
| 2004/0153412 A1 | 8/2004 | Fischer et al. |
| 2004/0186927 A1 | 9/2004 | Eryurek et al. |
| 2004/0187103 A1 | 9/2004 | Wickham et al. |
| 2004/0213384 A1 | 10/2004 | Alles et al. |
| 2004/0230828 A1 | 11/2004 | DeFuria et al. |
| 2005/0010323 A1 | 1/2005 | Cocciadiferro et al. |
| 2005/0033866 A1 | 2/2005 | Besson et al. |
| 2005/0071838 A1 | 3/2005 | Hatasaki |
| 2005/0132349 A1 | 6/2005 | Roberts et al. |
| 2005/0228798 A1 | 10/2005 | Shepard et al. |
| 2005/0273779 A1 | 12/2005 | Cheng et al. |
| 2006/0015862 A1 | 1/2006 | Odom et al. |
| 2006/0101457 A1 | 5/2006 | Zweifel et al. |
| 2006/0184927 A1 | 8/2006 | Deblaquiere et al. |
| 2006/0195839 A1 | 8/2006 | Lin et al. |
| 2007/0143450 A1 | 6/2007 | Kruse et al. |
| 2007/0168919 A1 | 7/2007 | Henseler et al. |
| 2007/0169079 A1 | 7/2007 | Keller et al. |
| 2007/0244584 A1 | 10/2007 | John et al. |
| 2008/0046104 A1 | 2/2008 | Van Camp et al. |
| 2008/0189693 A1 | 8/2008 | Pathak |
| 2008/0208365 A1 | 8/2008 | Grgic et al. |
| 2008/0271012 A1* | 10/2008 | Eykholt .......... 717/174 |
| 2008/0288933 A1 | 11/2008 | Budmiger et al. |
| 2008/0288936 A1 | 11/2008 | Ikeda |
| 2010/0131084 A1 | 5/2010 | Van Camp |
| 2010/0131939 A1 | 5/2010 | Hieb et al. |

FOREIGN PATENT DOCUMENTS

| | | |
|---|---|---|
| DE | 19701322 | 7/1998 |
| EP | 1001336 | 5/2000 |
| EP | 2189899 | 5/2010 |
| JP | H06295236 | 10/1994 |
| JP | 8123534 | 5/1996 |
| JP | 2002091956 | 3/2002 |
| JP | 2002373079 | 12/2002 |
| JP | 2004164075 | 6/2004 |
| JP | 2004265304 | 9/2004 |
| JP | 2004295299 | 10/2004 |
| JP | 2005073034 | 3/2005 |
| JP | 2005259115 | 9/2005 |
| JP | 2007235559 | 9/2007 |
| JP | 2008205075 | 9/2008 |
| WO | 0180023 | 10/2001 |
| WO | 02079884 | 10/2002 |
| WO | 03075206 | 9/2003 |
| WO | 2004092982 | 10/2004 |
| WO | 2005033934 | 4/2005 |

OTHER PUBLICATIONS

Search Report, issued by the European Patent Office on Mar. 22, 2010, in connection with European Application No. 09176835.8 (7 pages).

"Communication Pursuant to Article 94(3) EPC," issued by the European Patent Office on Jan. 25, 2011, in connection with European Application No. 09176835.8 (5 pages).

Intellectual Property Office, "UK Examination Report," issued in connection with Great Britain Application No. GB1091972.5.2, dated May 18, 2012, 3 pages.

Japanese Patent Office, "Notice of Reasons for Rejection", issued in connection with Japanese patent application No. 2009-257028, Nov. 29, 2013, 1 page.

State Intellectual Property Office of P.R. China "The Notification of the First Office Action", issued in connection with Chinese application No. 200910220996.6, dated Apr. 2, 2013, 13 pages, English Translation.

British Examination report for application No. GB0919725.2, mailed Jan. 3, 2013.

State Intellectual Property Office of P.R. China, "The Notification of Second Office action", issued in connection with Chinese patent application No. 200910220996.6, Dec. 10, 2013, 30 pages.

Great Britain Intellectual Property Office, "Search Report Under Section 17(5)," issued in connection with GB Patent Application No. GB0715422.2, Nov. 8, 2007, 3 pages.

European Patent Office, "Communication Pursuant to Article 94(3) EPC," issued in connection with European Application No. 09176848.1, Dec. 5, 2013, 4 pages.

State Intellectual Property Office of the People'S Republic of China, "The Notification of the Second Office Action," issued in connection with Chinese Patent Application No. 200910220995.1, Dec. 30, 2013, 11 pages.

Japan Patent Office, "Notice of Reasons for Rejection," issued in connection with Japanese Application No. P2009-267638, Nov. 28, 2013, 7 pages.

Great Britain Intellectual Property Office, "Examination Report under Section 18(3)," issued in connection with Great Britain Patent Application No. GB0920635.0, Aug. 13, 2012, 2 pages.

Great Britain Intellectual Property Office, "Examination Report under Section 18(3)," issued in connection with Great Britain Patent Application No. GB0920635.0, May 23, 2012, 3 pages.

State Intellectual Property Office of the People'S Republic of China, "The Notification of the First Office Action," issued in connection with Chinese Application No. 200910220995.1, Apr. 19, 2013, 14 pages.

Great Britain Intellectual Property Office, "Search Report under Section 17(5)," issued in connection with Great Britain Patent Application No. GB0920635.0, Mar. 11, 2010, 5 pages.

(56) References Cited

OTHER PUBLICATIONS

European Patent Office, "Extended European Search Report," issued in connection with European Application No. 09176848.1, Jan. 8, 2010, 7 pages.

United States Patent and Trademark Office, "Office Action," mailed on Jun. 15, 2009, in connection with U.S. Appl. No. 11/465,036, 26 pages.

United States Patent and Trademark Office, "Notice of Allowance," mailed on Nov. 19, 2009, in connection with U.S. Appl. No. 11/465,036, 29 pages.

United States Patent and Trademark Office, "Notice of Allowability," mailed on Jan. 8, 2010, in connection with U.S. Appl. No. 11/465,036, 8 pages.

United States Patent and Trademark Office, "Notice of Allowance," mailed on Mar. 25, 2014, in connection with U.S. Appl. No. 12/323,057, 71 pages.

United States Patent and Trademark Office, "Final Office Action," mailed on Nov. 20, 2013, in connection with U.S. Appl. No. 12/323,057, 51 pages.

United States Patent and Trademark Office, "Office Action," mailed on Jul. 12, 2013, in connection with U.S. Appl. No. 12/323,057, 53 pages.

United States Patent and Trademark Office, "Final Office Action," mailed on Jul. 6, 2012, in connection with U.S. Appl. No. 12/323,057, 36 pages.

United States Patent and Trademark Office, "Office Action," mailed on Mar. 15, 2012, in connection with U.S. Appl. No. 12/323,057, 28 pages.

Krishnamurthy et al., "Data Tragging Architecture for System Monitoring in Dynamic Enviroments," 2008 IEEE, 8 pages.

Parlavantzas et al., "Design Support for Componentising and Grid-enabling Scientific Applications," 2007 ACM, 8 pages.

Roehm et al., "Towards Identification of Software Improvements and Specificaiton Updates by Comparing Monitored and Specified End-User Behavior"; 2013 IEEE International Conference on Software Maintenance, 4 pages.

Shen et al., "Reference-Driven Performance Anomaly Identification"; 2009 ACM, 12 pages.

State Intellectual Property Office of P.R. China, "Third Office action", issued in connection with Chinese patent application No. 200910220996.6, issued on Jul. 18, 2014, 7 pages.

\* cited by examiner

SYSTEMS AND METHODS TO PROVIDE CUSTOMIZED RELEASE NOTES DURING A SOFTWARE SYSTEM UPGRADE OF A PROCESS CONTROL SYSTEM

FIELD OF THE DISCLOSURE

The present disclosure relates generally to process control systems and, more particularly, to systems and methods to update and manage software in process control systems.

BACKGROUND

Process control systems, like those used in chemical, petroleum or other processes, typically include one or more centralized process controllers communicatively coupled to at least one host or operator workstation and to one or more field devices via analog, digital or combined analog/digital buses. The field devices, which may be, for example, device controllers, valves, valve positioners, switches and transmitters (e.g., temperature, pressure and flow rate sensors), perform functions within the process control system such as opening or closing valves and measuring process parameters. A central process controller receives signals indicative of process measurements made by the field devices and/or other information pertaining to the field devices, uses this information to implement a control routine and then generates control signals that are sent over the buses or other communication lines to the field devices to control the operation of the process control system.

A company may operate several process plants, each having one or more process control systems having different configurations. Performing hardware and software maintenance on such systems can be an arduous task. Because the process control systems may be located at different plant sites at different geographical locations, system engineers may be subject to frequent travel between each plant site. Alternatively, each plant site may have system engineers responsible for maintaining the hardware and software associated with the components of a process control system. In any case, maintaining a company's process control systems often involves numerous different maintenance procedures.

Maintaining a company's process control systems often involves installation and/or updating of software running on components of the process control systems. Owners of process controls systems often waste valuable time using undocumented, locally created methods to install patches specified by a system supplier.

SUMMARY

Example systems and methods to update and maintain process control systems are described. In accordance with an example, a method is provided for customizing documentation for software updates or upgrades for a process control system. The example method includes compiling general release notes for at least one of an update or an upgrade of a process control system. The example method also includes instrumenting the general release notes to correlate the release notes with a general process control system to produce instrumented notes. The example method further includes matching configuration information for a particular process control system with the instrumented notes to filter the instrumented notes and produce customized notes for the particular process control system. The example method additionally includes providing the customized notes to a user of the particular process control system in conjunction with the at least one of an update or an upgrade to alert the user regarding potential effects of the at least one of an update or an upgrade on the particular process control system.

In accordance with an example, a customized documentation generation apparatus is provided for generating documents relevant to a software update or upgrade of a particular process control system. The example documentation generation apparatus includes a notes instrumentation module instrumenting general release notes for at least one of an update or an upgrade of a process control system to correlate the release notes with a general process control system configuration to produce instrumented notes. The example documentation generation apparatus also includes an upgrade assessment module determining configuration information for a particular process control system to provide default filter settings. The example documentation generation apparatus further includes an items of interest filter applying the default filter settings for the particular process control system to the instrumented notes to filter the instrumented notes and produce custom release notes for the particular process control system. The items of interest filter provides the custom release notes to a user of the particular process control system in conjunction with the at least one of an update or an upgrade to alert the user regarding potential effects of the at least one of an update or an upgrade on the particular process control system.

In accordance with an example, a graphical user interface wizard is provided for gathering master release notes and knowledge base articles related to at least one of a process control system software update or a process control system software upgrade, transforming the master release notes and knowledge base articles into custom release notes for a particular process control system implementation, and providing the custom release notes for user review. The example graphical user interface wizard includes a notes instrumentation module instrumenting the master release notes and knowledge base articles relating to the at least one of a process control system software update or a process control system software upgrade to correlate the mater release notes with a general process control system configuration to produce instrumented notes. The example graphical user interface wizard also includes an upgrade assessment module determining configuration information for the particular process control system implementation to provide default filter settings. The example graphical user interface wizard also includes an items of interest filter applying the default filter settings for the particular process control system implementation to the instrumented notes to filter the instrumented notes and produce custom release notes for the particular process control system. The items of interest filter providing the custom release notes to a user of the particular process control system in conjunction with the at least one of a process control system software update or a process control system software upgrade to alert the user regarding potential effects of the at least one of a process control system software update or a process control system software upgrade on the particular process control system.

In accordance with an example, a machine accessible medium is provided having instructions stored thereon. When executed, the stored instructions cause a machine to compile general release notes for at least one of an update or an upgrade of a process control system. The stored instructions, when executed, also cause a machine to instrument the general release notes to correlate the release notes with a general process control system to produce instrumented notes. The stored instructions, when executed, further cause a machine to match configuration information for a particular process control system with the instrumented notes to filter the instrumented notes and produce customized notes for the particular process control system. The stored instructions, when executed, additionally cause a machine to provide the customized notes to a user of the particular process control system in conjunction with the at least one of an update or an upgrade to alert the user regarding potential effects of the at least one of an update or an upgrade on the particular process control system.

DETAILED DESCRIPTION

Figure 1:
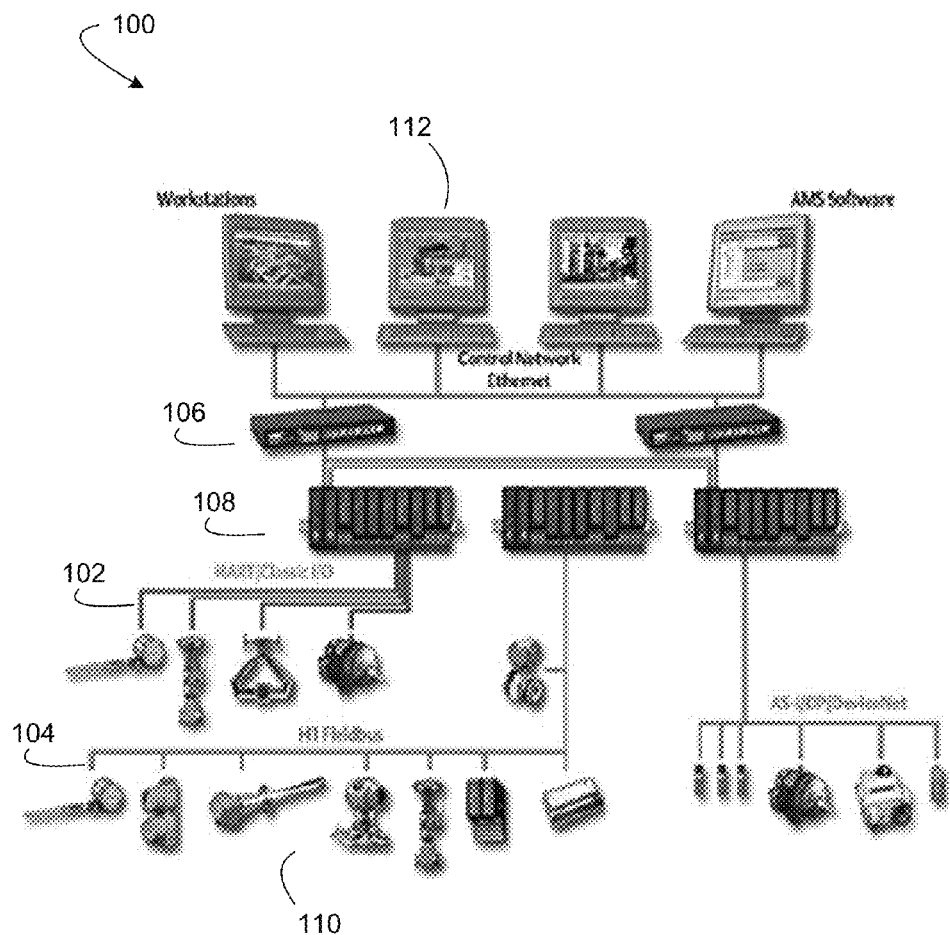
FIG. 1 illustrates an example process control system.

Although the following describes example systems including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example systems, persons of ordinary skill in the art will readily appreciate that the examples provided are not the only way to implement such systems.

A process control system may provide for continuous operation of its process twenty four hours a day, three hundred-sixty five days a year. Performing an upgrade and/or update of process control system software for workstations and control devices in the control system is a complex procedure that risks upsetting the continuous operation of the control system, thus resulting in loss of product and revenue, for example. Example systems and methods, described herein, provide on-line software upgrades/updates performed without process bumps or issues that would lead to a system upset.

In known systems, a new revision of a process control system software requires that each hardware platform (such as workstations, control platforms, and measurement devices) receive new software compatible with the new software system revision. Each piece of new software may include new functionality, changed functionality, and/or known incompatibilities, faults and/or issues. Changes and risks associated with the software upgrade/updates may be enumerated in a flat text document such as a "readme" or "release notes" file and provided to an end user to interpret. As software control systems increase in size and complexity, their associated release notes also grow in size and may contain a large portion of data that is of no interest to a particular end user. Eventually, the size of the release notes makes them difficult to use and decreases the effectiveness of the release notes to clearly communicate important information to the end user.

For example, software updates/upgrades may include security updates, anti-virus software, digital automation system updates and/or upgrades, operating system updates, and the like. In certain examples, software updating/upgrading is facilitated using a network-connected deployment tool (such as a Web-accessible machine in a control system) to obtain a bundle of one or more updates for each customer. Such downloading and deployment may be automatically facilitated, for example.

As an example, an update fixes a bug and/or improves upon existing software (e.g., updating from version 1.8 to 1.9), while an upgrade provides a new and improved version (e.g., upgrading from version 1 to version 2). In some examples, different files and documentation accompany updates versus upgrades. However, updates and upgrades may be treated similarly for download and installation. Upgrades may include a larger amount of software code to be distributed, whereas updates may be delivered on a smaller scale through a software delivery service to process control system components.

Example systems and methods, described herein, parse customer control system configuration information and filter release notes to remove release notes that do not apply to the customer system. Before installing and upgrade/update, the customer is alerted and/or otherwise warned regarding consequences/results of the upgrade/update based on their system configuration. Example systems and methods can operate on an exported configuration from a database and/or a runtime system to filter the release notes. Before installation of an update/upgrade, a compatibility tool may identify compatibility issues and identify cause(s) and effect(s) of the update/upgrade. Targeted messages may be generated based on system components affected.

In some examples, a process control system configuration may be exported and used to identify targeted update and/or upgrade related message(s) provided. A process control system controller may be accessed to determine the system configuration, for example.

Release notes may include several sections. For example, a release notes file may include 1) a read me first section, 2) known issues, 3) new functionality, 4) enhanced functionality, 5) resolved issues, 6) tips, and/or 6) specifics regarding known issues. Thus, a release notes document can be large and overwhelming to a user. In an example, a system and method review an end-user process control system prior to an update and/or upgrade to identify components and/or functionality affected by the update/upgrade. The release notes can be filtered to provide a user with information relevant to the particular process control system configuration.

For example, if a user's system does not include a safety system, then the release notes provided to the user will not include issues related to safety systems. Thus, the user can focus on information important/relevant to the user. A master or general release notes can include all information, and knowledge base articles can be provided relating to all aspects of an update/upgrade. The master release notes and knowledge base articles can be filtered based on the system configuration to present relevant information to the user.

In an example, custom filter settings are set automatically by reviewing a user process control system profile. A user can tweak the filter settings (e.g., by checking boxes for additional information in the release notes). For example, a user's process control system does not have a safety system installed, so the automated profile review would not include information related to a safety system update/upgrade. However, the user can specify that he or she would like to receive those notes because the user plans to add a safety system in the future.

Customized release notes can be output to a user in printed form and/or electronic form. Customized release notes can be made accessible online (e.g., via Web page), for example.

In an example, customization of release notes is triggered when a user indicates an update/upgrade for the process control system. Alternatively or in addition, customization of release notes is triggered when an update/upgrade for the process control system is automatically initiated. In an example, an online upgrade/update wizard guides the user through an update and/or upgrade, and one of the steps is the generation of custom release notes from available master release notes and knowledge base articles.

Certain examples described herein can be used to deploy updates/upgrades to a control system, such as a DeltaV™ digital automation system provided by Emerson Process Management. Additionally or alternatively, certain examples described herein can be used to update the firmware of a controller or Input/Output ("I/O") card and/or to distribute a new version of digital automation software to the rest of a running system.

FIG. 1 illustrates an example process control system 100 usable in conjunction with the software deployment system described herein. The example system 100 employs a digital plant process control architecture that integrates a variety of smart plant capabilities including field bus (such as HART® 102 and/or FOUNDATION™ fieldbus 104), high-speed discrete busses, embedded advanced control, and advanced unit and batch management, for example. Adaptive field integration provides an infrastructure for a variety of applications including device management for device re-ranging, configuration and diagnostics, for example.

The process control system 100 scales in size and/or functionality. The process control system 100 can provide plug-and-play OPC (open connectivity via open standards) and XML (extensible markup language) integration, fieldbus, batch control, and advanced control technologies, for example.

The process control system 100 can also provide varying levels of redundancy. For example, an operator can choose a level of redundancy for an application, including: 1) redundant network communications (for example, Ethernet); 2) redundant controllers; 3) redundant power supplies; 4) redundant fieldbus interfaces and bus power; 5) redundant digital I/O; 6) redundant serial communications (for example, MODBUS, RS485, etc.); and 7) redundant workstations.

The process control system 100 can provide flexible, system-wide security management for all users including operators, engineers, technicians, and other automation users based on user login, keys control system functionality and/or span of operator control. Security settings may include: 1) an operating span of control by plant area; 2) alarm limits, tuning parameters change privilege; and/or 3) security by both user and by physical location, for example.

The process control system 100 can also accommodate an addition of system components including controllers 106, I/O devices 108, field devices 110, and workstations 112, for example, while the system is powered and running. Thus, an operator can expand and upgrade the process control system 100 on the fly.

The process control system 100 can also support a full range of analog, discrete, thermocouple, and resistance temperature detectors (RTDs) for existing field devices, for example. The process control system 100 can include one or more sensor busses supporting installation and operation of discrete devices, such as pushbuttons, on/off valves, and proximity switches, for example. The system 100 can include one or more device busses that connect motor starters, drives, and other more complex devices, for example. The fieldbus 104, such as a FOUNDATION fieldbus, delivers predictive alerts, millisecond data capture, validated data, field-based control, diagnostics, and asset information bi-directionally within the digital automation system to help predict maintenance problems before they occur.

Devices can be automatically recognized by the process control system 100 as they are added, for example. The process control system 100 can coordinate aspects of automation engineering including but not limited to control strategies, process graphics, history, events, change management, and bulk editing and data entry, for example. The process control system 100 can also be used to develop types of control including but not limited to logic, regulatory, sequential, and advanced control, for example. The process control system 100 can further include one or more libraries of pre-defined control strategies, stress-tested digital bus devices files, etc.

The process control system 100 can provide digital automation systems with validated data, displaying quality, status, and diagnostics from field devices. As an example, alarm management is built on EEMUA 191, developed by a consortium of leading process industry automation users and suppliers, and designed to eliminate nuisance alarms. In particular, the process control system 100 can support EEMUA 191 standards by allowing operator suppression of alarms; timestamp and history of suppressed alarms; removing suppressed alarms from alarm banner and alarm summary; and/or maintaining a suppressed alarm summary, for example.

The example methods and systems described herein involve using an example online maintenance system that is communicatively coupled to one or more remotely located process control systems and configured to monitor various aspects of the process control system to generate preventative and/or corrective maintenance information. For example, the example online maintenance system may be implemented using one or more maintenance servers at a central facility executing machine accessible instructions (e.g., computer code, software, etc.) that cause the maintenance servers to communicate via the Internet and/or other communication network(s) (e.g., a local area network ("LAN"), a wireless LAN ("WLAN"), a wide area network ("WAN"), etc.) with one or more remotely located process control system servers and that cause the maintenance servers to obtain process control system information (e.g., performance information, operating information, etc.) from the process control system servers.

The example online maintenance system described herein may analyze the process control system information to determine whether any preventative maintenance or corrective maintenance is available for any portion of the one or more process control systems. The process control system information may be indicative of various types of operating conditions of each process control system including, for example, the software and/or firmware executed by the equipment in each process control system, any equipment failures within the systems, operating efficiencies, part numbers and manufacturers of equipment used to implement the systems, and/or many other types of operating conditions. To detect whether maintenance procedures should be performed, in some example implementations, the example online maintenance system may compare at least some of the process control system information with knowledgebase articles ("KBA's") (e.g., maintenance database entries) that describe issues (e.g., software bugs, equipment failures, operating anomalies, etc.) and suggested workarounds, fixes, or other maintenance procedures associated with overcoming or remedying the issues.

The example online maintenance system may be implemented using a web-based interface such as, for example, a web-based portal. In some example implementations, users may access the example online maintenance systems via virtually any computer system having network access and capable of rendering web pages. In this manner, unlike traditional techniques used to maintain process control systems, users may access maintenance information and perform maintenance procedures when located remotely from a process control system (e.g., not within the plant or off the process control system premises).

The example online maintenance system may also be implemented to provide a plurality of other features. For example, the example online maintenance system may be configured to send alerts via e-mail, pager, mobile phone, landline phone, really simple syndication ("RSS"), etc. to users (e.g., system operators, system engineers, maintenance engineers, etc.) if one or more particular conditions are met (e.g., a failure condition, a change in software or hardware, availability of firmware updates or software upgrades, etc.). The example online maintenance system may also generate various maintenance reports, monitor the lifecycle status of portions of the process control systems, organize and track information (e.g., expiration dates) associated with product warranty and support services, store and display status of open maintenance tickets or maintenance calls, and other features described below.

Figure 2:
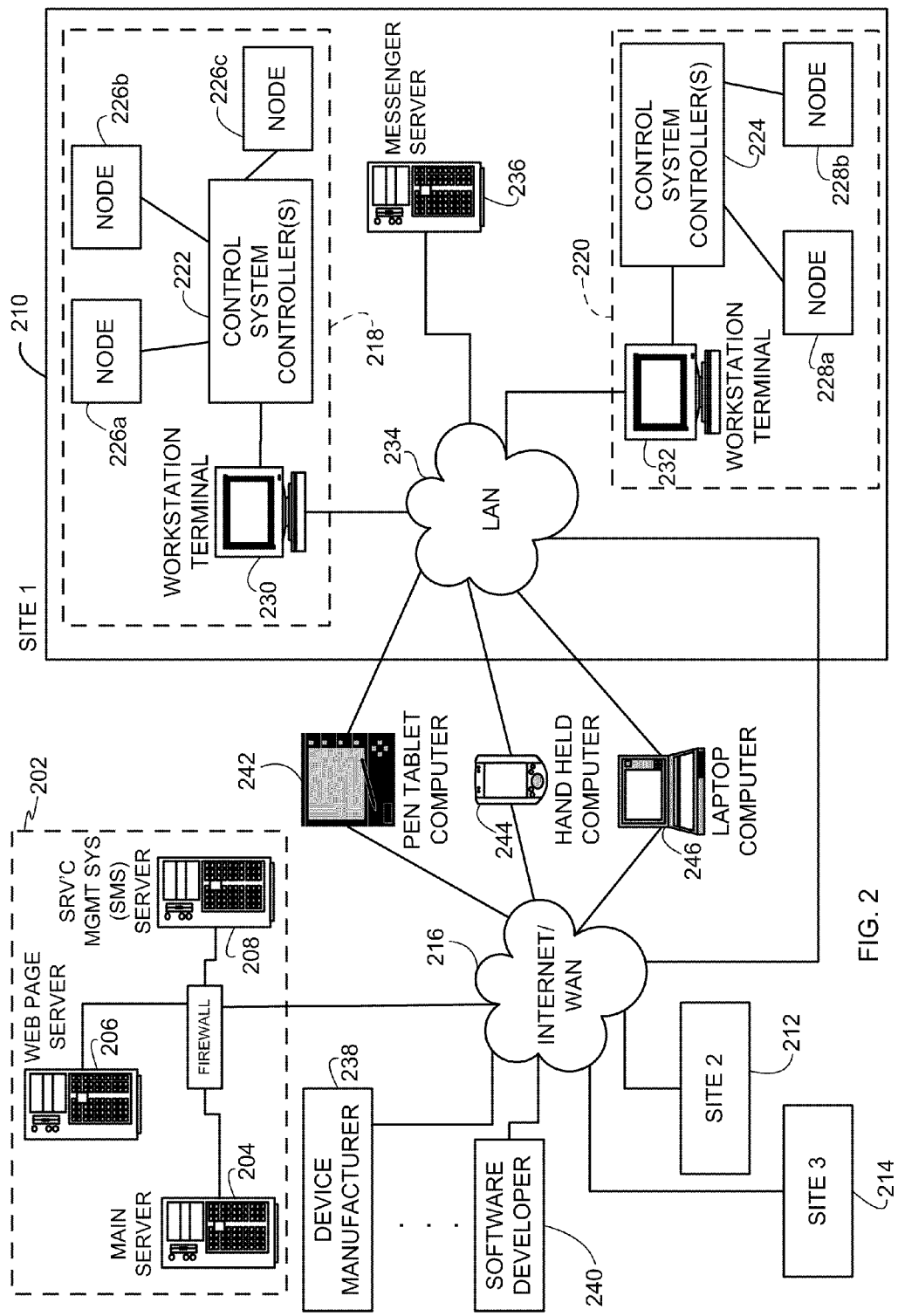
FIG. 2 is a block diagram illustrating an example online maintenance system communicatively coupled to a process control system.

Now turning to FIG. 2, an example online maintenance system 202 includes a main server 204, a web page server 206, and a service management system ("SMS") server 208. In alternative example implementations, the example online maintenance system 202 may include fewer or more servers than depicted in FIG. 2 to implement the example features, services, and capabilities of the example online maintenance system 202 described herein.

In the illustrated example, the main server 204 is configured to receive registration and/or configuration information associated with process control systems (e.g., example process control systems 218 and 220) monitored by the example online maintenance system 202. The registration and/or configuration information may include field device information, software information, firmware information, operational status information, maintenance information, lifecycle information, etc. associated with hardware, software, and/or firmware used to implement the components and devices of monitored process control systems 218 and 220. The main server 204 may receive the registration and/or configuration information during an enrollment process of a process control system (e.g., when a process control system is brought online for the first time to be monitored by the example online maintenance system 202). In addition, the main server 204 may receive new and/or updated registration and/or configuration information periodically and/or aperiodically after an enrollment process to ensure that the example online maintenance system 202 has the latest and up-to-date information corresponding to monitored process control systems.

The main server 204 is also configured to monitor process control systems. For example, the main server 204 may be provided with software that, when executed, causes the main server 204 to monitor field devices and/or other components or devices of monitored process control systems based on, for example, the registration and/or configuration information received from the process control systems.

In the illustrated example, the web page server 206 is configured to create and serve web pages to operators of monitored process control systems. In the illustrated example, the web page server 206 serves web pages including one or more graphical user interfaces ("GUI's"). The web pages may be used by operators to provide information to and retrieve information from the example online maintenance system 202. For example, the web pages served by the web page server 206 may be used to register a process control system with the example online maintenance system 202 and to provide registration and/or configuration information to the main server 204.

In the illustrated example, the main server 204 and the web page server 206 are implemented separately to enable taking the web page server 206 offline without compromising the monitoring processes and registration/configuration information receiving processes performed by the main server 204. For example, the web page server 206 may be taken offline to perform maintenance (e.g., to add or upgrade web page interfaces, update security software, etc.) while the main server 204 continues to monitor process control systems.

In the illustrated example, the SMS server 208 is configured to store and process the registration/configuration information corresponding to each process control system monitored by the example online maintenance system 202. For example, the SMS server 208 may include and/or be communicatively coupled to one or more data structures (e.g., databases) that store the registration/configuration information. The SMS server 208 may also be configured to store knowledge base articles ("KBA's") (e.g., maintenance database entries or other database entries that include maintenance information or other information about process systems and/or parts thereof) that describe issues (e.g., software bugs, equipment failures, operating anomalies, etc.) associated with different components or devices of process control systems. Typically, the KBA's also include suggested workarounds, fixes, or other maintenance procedures associated with overcoming or remedying the indicated issues. In the illustrated example, KBA's can be general type KBA's that are related to a process control system generally or KBA's can be specific device type KBA's that are related to specific parts (e.g., field devices, workstations, controllers, etc.) or portions (e.g., subsystems) of a process control system.

In the illustrated example, the SMS server 208 is configured to perform a KBA matching process. In general, the KBA matching process compares information stored in a KBA (e.g., identification information, device type information, or other criteria) to the registration/configuration information to determine which KBA's are applicable or relevant to which monitored process control systems.

The example online maintenance system 202 is communicatively coupled to a first site 210, a second site 212, and a third site 214 via the Internet (or other wide area network ("WAN")) 216. A WAN may be implemented using, for example, a telephone line, a digital subscriber line ("DSL"), an integrated services digital network ("ISDN"), a broadband cable system, a broadband alternating current ("AC") system, a satellite communication system, etc.

The sites 210, 212, and 214 may be part of a single enterprise (e.g., operated by the same business entity, company, corporation, etc.) and may include manufacturing sites, distribution sites, refinery sites, paper mills, or any other type of industrial or business site having operations associated with process control systems. While the first site 210 is illustrated in relatively more detail than the second and third sites 212 and 214, one or both of the second and third sites 212 and 214 may be implemented using configurations substantially similar or identical to (or different from) the illustrated configuration of the first site 210. In any case, the sites 210, 212, and 214 include one or more process control systems that are monitored and maintained using the example online maintenance system 202.

In the illustrated example, the first site 210 includes first and second distributed process control systems 218 and 220. The process control systems 218 and 220 may be used to perform substantially the same or different operations. For example, one of the process control systems 218 and 220 may be used to handle process fluids while the other may be used to operate a product manufacturing process. Of course, the process control systems 218 and 220 may be used to perform operations performed with any other type of process.

The first and second process control systems 218 and 220 include respective controllers 222 and 224, which are communicatively coupled to respective nodes 226a-c and 228a-b. At least some of the nodes 226a-c and 228a-b may include field devices such as, for example, device controllers, valves, valve positioners, switches, and/or transmitters (e.g., temperature, pressure, and flow rate sensors). The controllers 222 and 224 may be used to communicate configuration and control information to the nodes 226a-c and 228a-b and receive information from the nodes 226a-c and 228a-b including, for example, configuration information, control information, status information, measurement information, analysis information, etc. Although not shown, the process control systems 218 and 220 may include other process control system equipment including, for example, I/O modules, redundant equipment to provide fault tolerant features, wireless base stations for communicating with wireless field devices, etc., any of which may be represented by one of the nodes 226a-c and 228a-b.

The first and second process control systems 218 and 220 also include respective first and second workstation terminals 230 and 232, each of which is communicatively coupled to a respective one of the controllers 222 and 224. The workstation terminals 230 and 232 are communicatively coupled to a local area network ("LAN") 234, which is communicatively coupled to the Internet 216, and enables the process control systems 218 and 220 to communicate with the example online maintenance system 202. The LAN 234 may be implemented using a wired network (e.g., Ethernet, Token Ring, IEEE 1394, universal serial bus ("USB"), etc.) or a wireless network (e.g., IEEE 802.11 (Wi-Fi®), Bluetooth®, 900 MHz, etc.).

In some example implementations, to substantially reduce or eliminate compromising the security (e.g., data security, network security, etc.), integrity, etc. of the process control systems 218 and 220, some users may elect to not communicatively couple the process control systems 218 and 220 to the LAN 234 and/or may elect to restrict human access to the process control systems 218 and 220. In such a configuration, to communicate information about the process control systems 218 and 220 to the example online maintenance system 202, authorized users with physical access to one or both of the workstation terminals 230 and 232 may initiate processes in the workstation terminals 230 and 232 to collect and organize saved data (e.g., process control system information) intended for the example online maintenance system 202 using encrypted extensible markup language ("XML") files. The authorized user can then store the encrypted XML files on a portable machine readable medium (e.g., a CD-ROM, a USB memory stick, a magnetic disk, etc.) and physically transport the encrypted XML files from the workstation terminals 230 and 232 to a processor system (e.g., a pen tablet computer 242, a hand held computer 244, a laptop computer 246, or another workstation) communicatively coupled to the Internet 216. The user can then upload the encrypted XML files to the main server 204. The user may periodically or aperiodically repeat the process to update the process control system information stored at the example online maintenance system 202. This example implementation enables the example online maintenance system 202 to provide its services and respond in a timely fashion to changes in the process control systems 218 and 220. As a result, users are able to obtain the benefits of the services provided by the example online maintenance system 202 while ensuring information integrity and security of the process control systems 218 and 220.

The workstation terminals 230 and 232 may store application programs including machine accessible or readable instructions that, when executed, cause the workstation terminals 230 and 232 to exchange information with the controllers 222 and 224 and the example online maintenance system 202. The workstation terminals 230 and 232 may communicate with the controllers 222 and 224 to communicate configuration information and control information to field devices at the nodes 226a-c and 228a-b and receive measurement information, analysis information, operating condition information, status information, and other maintenance information (e.g., software version, hardware version, serial number, manufacturer, date of installation, last date of maintenance, etc.). The terminals 230 and 232 may communicate at least some of the information received from the controllers 222 and 224 and the nodes 226a-c and 228a-b to the example online maintenance system 202. In addition, the terminals 230 and 232 may receive maintenance information from the example online maintenance system 202 that pertains to the controllers 222 and 224, the nodes 226a-c and 228a-b and devices attached thereto, and any other equipment communicatively coupled to the terminals 230 and 232. In this manner, the terminals 230 and 232 may inform users (e.g., an operator, a system engineer, an administrator, etc.) when updates, upgrades, or other maintenance information (e.g., technical documentation, replacement device availabilities, etc.) are available.

The first site 210 also includes a messenger server 236 communicatively coupled to the LAN 234 and configured to communicate with the process control systems 218 and 220. In the illustrated example, the messenger server 236 is configured to generate and/or track alarms and/or events associated with the process control systems 218 and 220. For example, the messenger server 236 may obtain alarms generated by the field device nodes 226a-c and 228a-b, the controllers 222 and 224, and/or the workstation terminals 230 and 232. In some example implementations, any of the equipment used to implement the process control systems 218 and 220 may be configured to generate alarms based on, for example, threshold measurement values, hours of operation, efficiency, or any other type of operating condition. Additionally or alternatively, the messenger server 236 may be configured to generate alarms based on operating condition information obtained from the process control systems 218 and 220. In any case, the messenger server 236 may store and track the status of the alarms in a data structure (e.g., a database) and generate reports based on the alarm information.

In the illustrated example, the messenger server 236 may also generate event information. Events may include, for example, equipment status changes (e.g., enabled, disabled, on/off, equipment error, etc.), operator changes, equipment configuration changes (e.g., new configuration downloaded to a field device). The messenger server 236 may store and track the status of the events in a data structure (e.g., a database) and generate reports based on the stored event information.

The example online maintenance system 202 may access the alarm and event information stored in the messenger server 236 and use the alarm and event information to determine whether maintenance may be required or whether any maintenance information (e.g., product documentation, bug reports, knowledgebase articles, product updates, etc.) may be available for any equipment in the process control systems 218 and 220.

A user may use the first and second workstation terminals 230 and 232 to access information obtained from the controllers 222 and 224, the example online maintenance system 202, and/or the messenger server 236. In an example implementation, the terminals 230 and 232 may execute dedicated client-side software applications that establish network connections with the example online maintenance system 202 to exchange maintenance information with the online maintenance system 202. Alternatively or additionally, the terminals 230 and 232 may execute web browsers to access web pages or web-based applications to access the example online maintenance system 202 and to perform substantially the same or similar operations as with a dedicated client-side software application. In any case, a user may use the dedicated client-side application or the web-based application to view, modify, and manage the maintenance information obtained from the controllers 222 and 224, the example online maintenance system 202, and the messenger server 236.

A user may perform maintenance related work via the terminals 230 and 232. For example, the user may instruct the terminals 230 and 232 and/or the example online maintenance system 202 to update or upgrade particular equipment (e.g., field devices, the controllers 222 and 224, etc.) with received software or firmware updates. Also, the user may view summary and detail information pertaining to open service calls associated with the process control systems 218 and 220. In some example implementations, the terminals 230 and 232 may also be configured to view, modify, and/or manage information associated with process control systems in the second and third sites 212 and 214.

The example online maintenance system 202 may obtain maintenance information such as software/firmware updates, replacement device availability, manuals, technical documentation, bug reports, etc. from software vendors and device manufacturers. In the illustrated example, a device manufacturer system 238 and a software vendor system 240 are communicatively coupled to the Internet 216 to provide hardware and software/firmware update information to the example online maintenance system 202. In this manner, the example online maintenance system 202 can select update information pertaining to control systems in each of the sites 210, 212 and 214 and forward the selected information to the respective sites 210, 212, and 214.

The example implementation of FIG. 2 also includes the pen tablet computer 242, the handheld computer 244, and the laptop computer 246, all of which may be communicatively coupled to the Internet 216 and/or the LAN 234 to communicate with the example online maintenance system 202, the process control systems 218 and 220, and the messenger server 236. Users may use one or more of the pen tablet computer 242, the handheld computer 244, the laptop computer 246, or any other computer (e.g., a desktop computer) coupled to the Internet 216 or the LAN 234 and remotely located from the site 210 to access maintenance information associated with the site 210 in a manner substantially similar to that described above in connection with the workstation terminals 230 and 232. For instance, the pen tablet computer 242, the handheld computer 244, and the laptop computer 246 may execute dedicated client-side applications and/or web-based applications (or web pages) to view, modify, and/or manage the maintenance information associated with the process control equipment at any of the sites 210, 212, or 214.

In certain examples, a running process control system is automatically examined to verify its fitness for an upgrade and/or upgrade to a new software system revision. As part of the fitness determination, configuration information for the process control system (e.g., hardware components, software components, firmware components, settings for system components, user preferences, tasks, etc.) is determined. Based on the fitness of the process control system and process control system configuration information, release notes can be created that are tailored to the particular process control system to increase the effectiveness of the release notes in bringing possible issues to the end users' attention.

Figure 3:
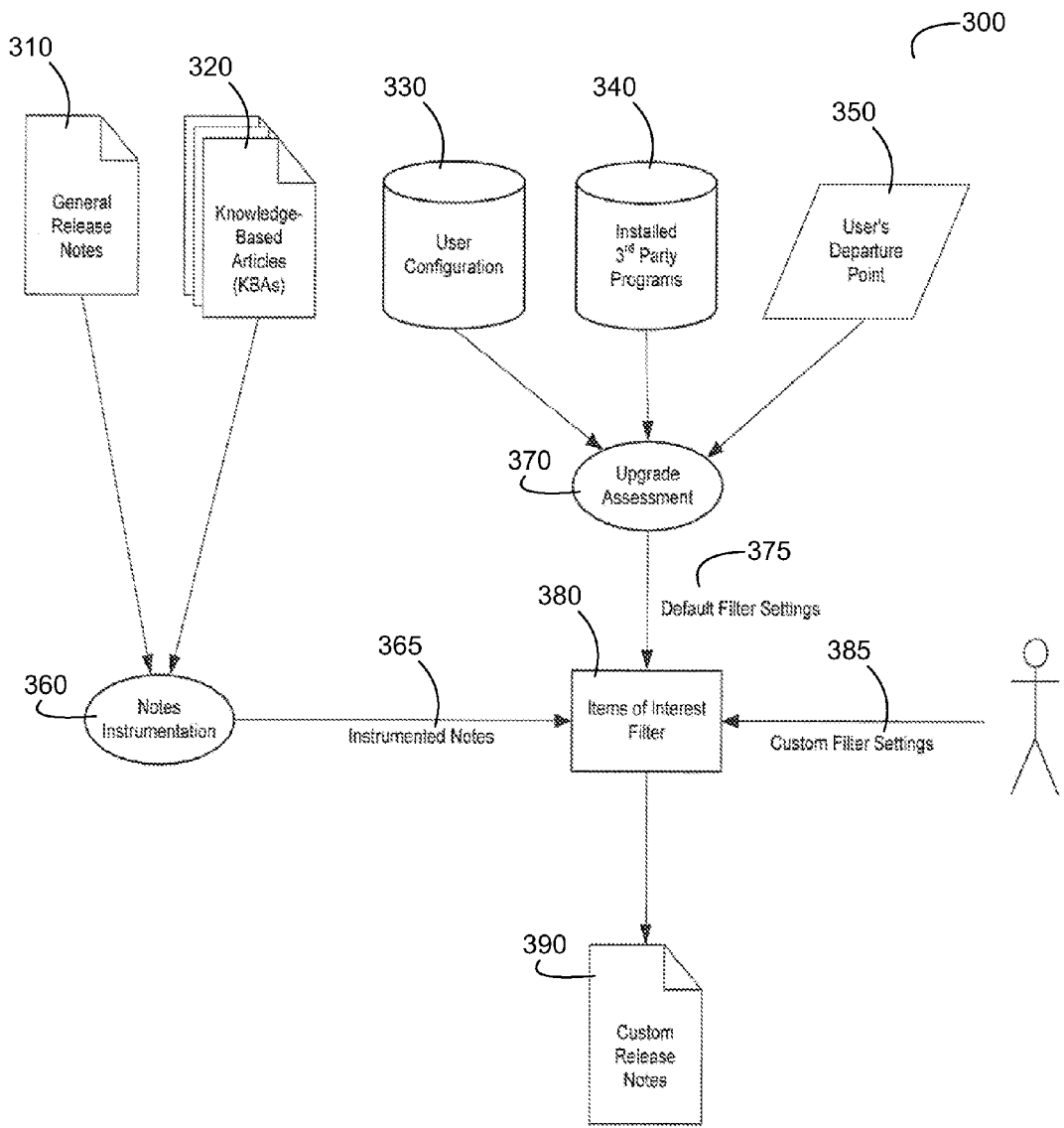
FIG. 3 is an example system for customization of documentation for a particular process control system.

FIG. 3 illustrates an example system 300 for customization of documentation for a particular process control system. The system 300 includes general release notes 310, knowledge base articles ("KBAs") 320, user configuration information 330, third party program installation information 340, a user departure point 350, a notes instrumentation module 360, an upgrade assessment module 370, an items of interest filter 380, and custom release notes 390. Components of the system 300 can be implemented alone and/or in various combinations of hardware, software, and/or firmware, for example.

Updates/upgrades may include process control system software, operating system software, anti-virus software, security software, etc. Files delivered to a process control system may include process control system hot fixes, operating system and/or other application security updates, virus pattern updates, anti-virus engine updates, etc. Installation help may include related release notes 410 and KBA document(s) 420; a target process control system's identification number, system name, and location; target nodes in the system; if a reboot is involved (e.g., yes or no); and if a service disruption is involved (e.g., yes or no) such as stopping an application in order to update it, for example.

As an example, an update or upgrade code package may be provided with metadata identifying a target computer or group of computers for update/upgrade. Objects provided in the code package may be executed to provide an update and/or upgrade and replace a previous version. As an example, an eXtensible Markup Language ("XML") structure may be used to distribute metadata for software update(s)/upgrade(s).

Using the system 300, release notes are instrumented to associate each change or risk in the notes for an update and/or upgrade to a corresponding component or feature of a process control system. These tagged release notes can then be compared against the end user's process control system's configuration database to produce custom release notes. The end user may have the option to manually show or hide areas of the release notes. This may be done to concentrate on a particular area of interest for that user and/or to show issues related to software modules or hardware that are not currently installed, but may be installed in the future, for example.

As illustrated, for example, in FIG. 3, general release notes 310 for one or more updates and/or upgrades and KBAs 320 associated with the one or more updates/upgrades are provided to the notes instrumentation 330 to produce instrumented notes 365 associating each change or risk in the general release notes 310 and/or KBAs 320 for an update and/or upgrade to a corresponding component or feature of a process control system. The instrumented notes 365 are provided to the items of interest filter 380.

Additionally, user configuration information 330, installed third party program information 340, and user departure point 350 are provided to the upgrade assessment 370 to produce default filter settings 375 for the process control system. The user departure point 350 specifies a currently installed revision of software, for example. The default filter settings 375 are provided to the items of interest filter 380.

The items of interest filter 380 applies the default filter settings 375 to the instrumented notes 365 to filter the notes 365 based on the user configuration information 330, third party application information 340, user departure point 350, etc. Thus, the general release notes 310 and KBAs 320 can be filtered or reduced to provide only relevant information for the particular process control system configuration, for example.

Additionally, the items of interest filter 380 receives custom filter settings 385 from a user. The filter 380 takes the user's custom filter settings 385 into account when filtering the instrumented notes 365. For example, the custom filter settings 385 may specify inclusion and/or exclusion of information from the instrumented notes 365 that would otherwise have been included and/or excluded by the default filter settings 375.

After filtering the instrumented notes 365 based on the default filter settings 375 and the custom filter settings 385, the items of interest filter 380 generates custom release notes 390. The custom release notes 390 provide information to a user regarding an impact of one or more potential updates/upgrades on the user's process control system implementation. The custom release notes 390 can be provided electronically to a user via Web page, email, and/or other electronic data transmission or portal. The custom release notes 390 can be navigated via an electronic interface (e.g., a Web page/portal and/or a software application on a user workstation) and/or printed, for example. The custom release notes 390 can be generated, printed, and mailed to the user, for example.

Figure 4:
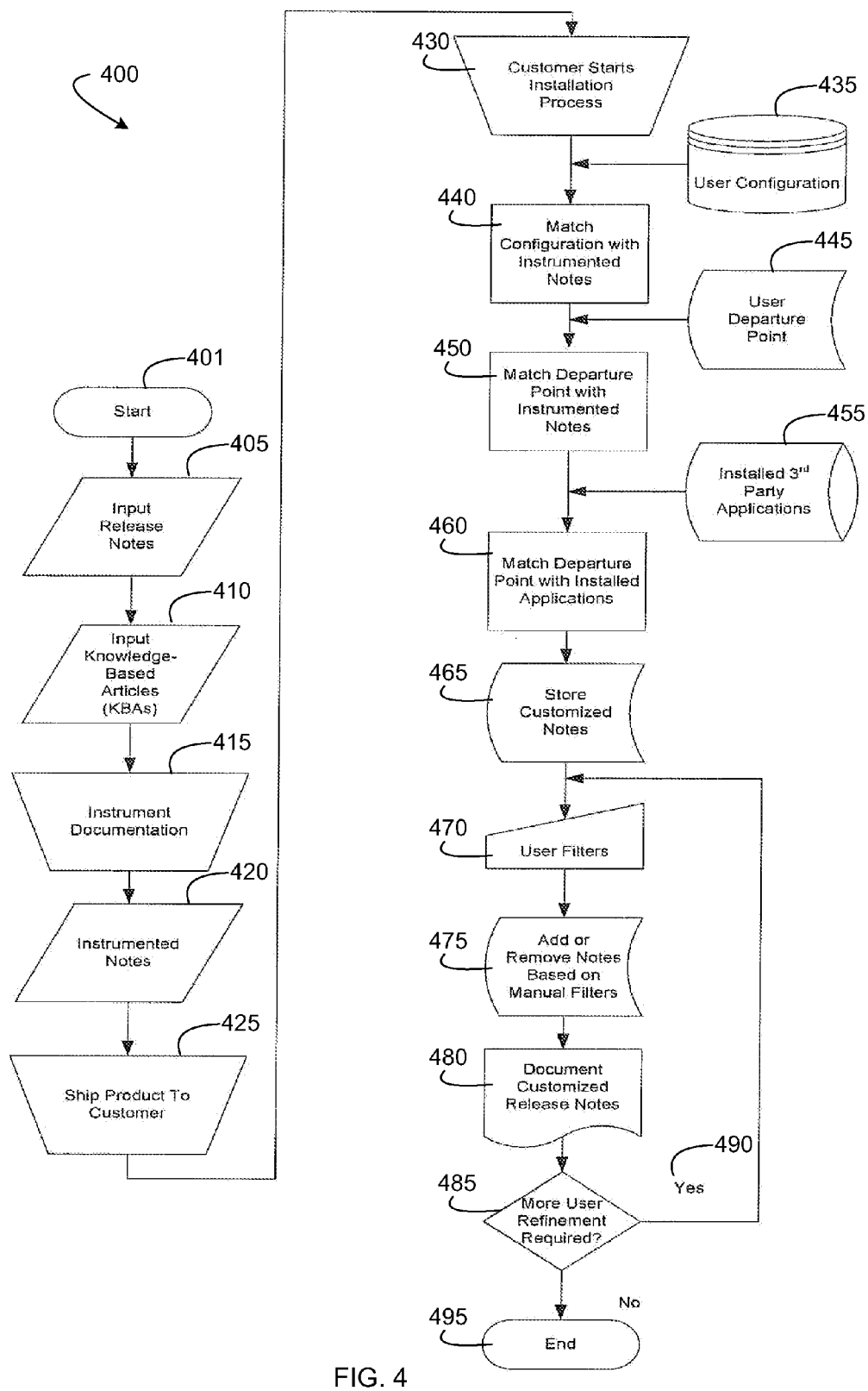
FIG. 4 depicts a flow diagram of an example method that may be used to generate and deploy custom release notes for updates and/or upgrades related to a particular process control system.

FIG. 4 illustrates a flow diagram for an example method 400 of release notes customization for updates and/or upgrades related to a particular process control system. At 401, the process is initiated when release notes and knowledge-based articles ("KBAs") become available for an update/upgrade.

At 405, release notes (e.g., the general release notes 310 of FIG. 3) are input for processing. At 410, KBAs (e.g., the KBA 320 of FIG. 3) are input for processing. At 415, documentation, including the release notes and KBAs, are instrumented. For example, after the release notes and KBAs are available, they are marked with areas (e.g., components and/or features of a process control system, such as process control system 100 of FIG. 1 and process control system 218 and 220 of FIG. 2) that may be affected by the item. Instrumentation of the documentation (e.g., via the notes instrumentation module 360 of FIG. 3) produces instrumented notes 420 (such as the instrumented notes 365 of FIG. 3).

At 425, the instrumented notes 420 are then shipped with the end product (e.g. the update/upgrade) to the customer. The end product and instrumented notes 420 may be shipped and provided electronically (e.g., via a Web portal), on a portable electronic medium, etc.

At 430, the customer begins installation of the update/upgrade. A user configuration 435 (for example, the user configuration information 330 of FIG. 3) is provided including information about the customer's process control system and preferences. At 440, the user configuration 435 is matched with the instrumented notes 420. Matching the user configuration 435 with the instrumented notes 420 refines or filters the instrumented notes 420 based on the user configuration 435, for example.

At 450, a user departure point 445 (e.g., the user departure point 350 specifying a current software version for the process control system) is matched with the instrumented notes 420. Items specific to the user's departure point 445 (current software revision) are matched with items in the instrumented notes 420. Matching the user departure point 445 with the instrumented notes 420 refines or filters the instrumented notes 420 based on the current process control system software version, for example.

At 460, third party applications 455 installed on the user's process control system (e.g., the installed third party application information 340 illustrated in FIG. 3) is matched with the departure point 445. Any installed third party software 455 with issues listed in the release notes may be combined with the configuration-specific and departure point-specific items to create customized release notes. Matching the user departure point 445 with the installed third party application information 340 further specifies a description of the configuration of the process control system, for example, and can be used to further filter the instrumented notes 420 for the particular process control system.

Matching of the instrumented notes 420 with the user configuration 435, user departure point 445, and installed third party applications 455 may be facilitated the upgrade assessment module 370 illustrated in FIG. 3, for example.

At 465, customized notes (e.g., the custom release notes 390 of FIG. 3) are stored. Customized notes may be saved locally and/or remotely for later reference by the process control system user, for example. At 470, the user may filter the customized notes. For example, users can filter the customized release notes to hide any items or show any items that were automatically hidden as part of the customization process. At 475, notes are added and/or removed from the customized notes based on the manual user filters. At 480, the customized release notes are documented (e.g., as the custom release notes 390 discussed above in relation to FIG. 3).

At 485, further user refinement may be detected. If further user changes are detected 490, then user filters are again applied at 470, for example. If no further user changes are detected, then customization ends 495.

Once a process control system is installed to a particular software revision, a list of relevant hot fixes and/or other updates/upgrades that should be applied to the process control system may be recommended based on the process control system's hardware usage, software component usage, and/or control strategy algorithms in use, for example.

One or more of the operations of the method 400 may be implemented alone or in combination in hardware, firmware, and/or as a set of instructions in software, for example. Certain examples may be provided as a set of instructions residing on a computer-readable medium, such as a memory, hard disk, DVD, or CD, for execution on a general purpose computer or other processing device.

Certain examples may omit one or more of these operations and/or perform the operations in a different order than the order listed. For example, some operations may not be performed in certain examples. As a further example, certain operations may be performed in a different temporal order, including simultaneously, than listed above.

Figure 5:
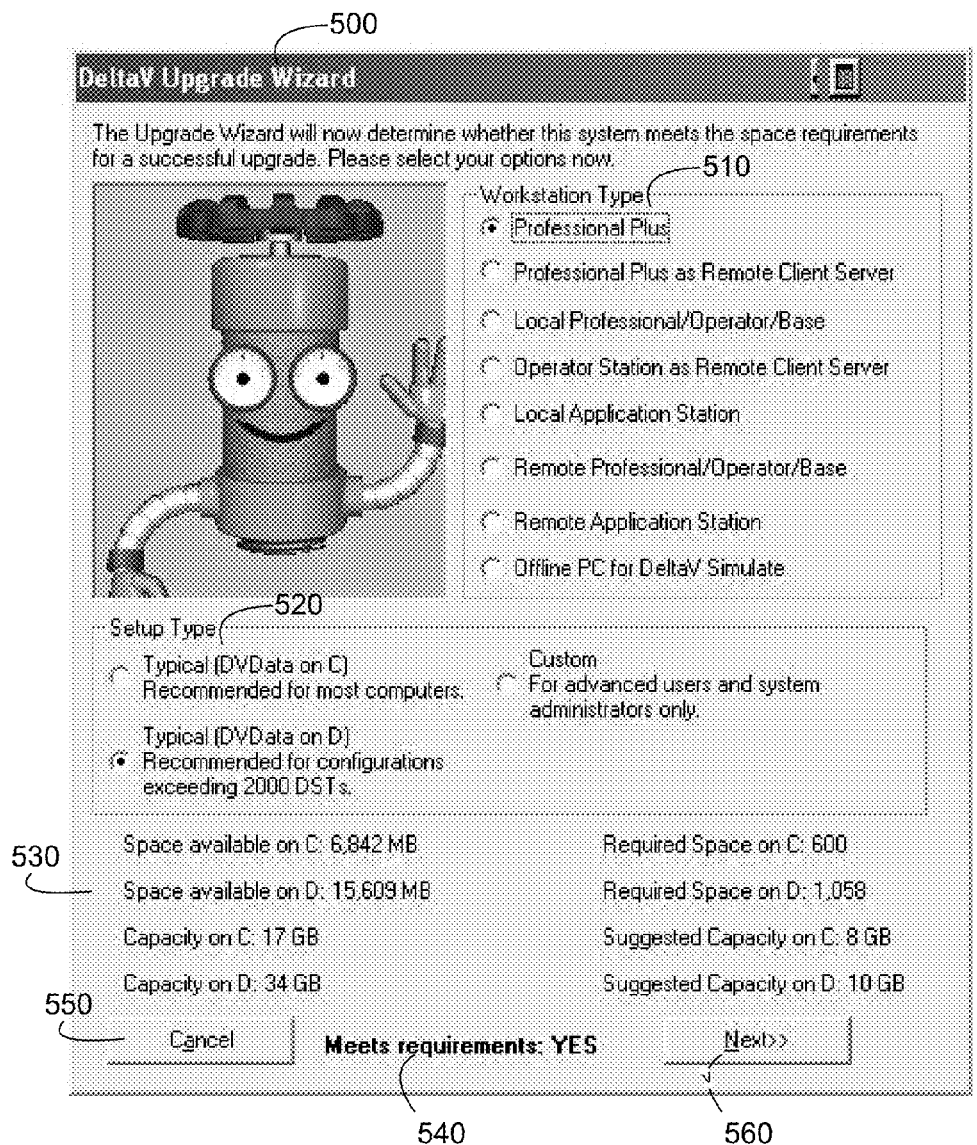
FIG. 5 is an example graphical user interface for an upgrade wizard that may be used to facilitate user installation of an upgrade to a process control system.

FIG. 5 depicts an example graphical user interface 500 that may be used to facilitate user installation of an upgrade to a process control system, such as a DeltaV process control system, the process control system 100, etc., via an upgrade wizard. The user interface 500 can trigger an automatic generation and/or retrieval of custom release notes related to the upgrade, as described above in relation to FIGS. 3 and 4, for example. The user interface 500 can be used in conjunction with the online maintenance system 202 of FIG. 2, for example. The graphical user interface screen 500 may be the first screen the user sees to perform a process control system upgrade, for example. The user interface 500 allows the user to specify a workstation type 510 and a setup type 520, for example. As shown, for example, in FIG. 5, the workstation type 510 may include a professional plus workstation, professional plus as remote client server, local professional/operator/base, operator station as remote client server, local application station, remote processional/operator/base, remote application station, offline computer for process control system simulation, etc. As shown, for example, in FIG. 5, the setup type 520 may include typical (e.g., process control system data on the workstation's C: or D: hard drive), custom, etc.

The user interface 500 may also provide the user with a summary of relevant process control system workstation information, such as available storage space, required space for upgrade, recommended storage space, etc. Additionally, the user interface 500 may provide an indication 550 of whether the workstation meets the requirements for upgrade installation. After making selections and reviewing information, the user can elect to cancel 550 the installation or proceed 560, for example.

Figure 6:
FIG. 6 is an example graphical user interface providing a current state of an upgrade in a process control system upgrade wizard.

FIG. 6 depicts an example graphical user interface 600 providing a current state of an upgrade in a process control system upgrade wizard. User options may include process control system software uninstall 610, process control system database migration 620, process control system software backup configuration 630, process control system software installation 640, process control system configuration restoration 650, controller I/O upgrade 660, process control system extras restoration 670, etc.

In some examples, an upgrade/update verification wizard executes before a process control system software uninstall. A current process control system configuration may be exported so that the configuration may be re-imported after the new version of the process control system software is installed. For example, after a process control system software upgrade has been initiated, the process control system configuration may be exported, followed by verification of the suitability of the upgrade, software uninstall, and upgrade installation. In an example, an update/upgrade may be installed to modify a current software installation without uninstalling the current software.

Figure 7:
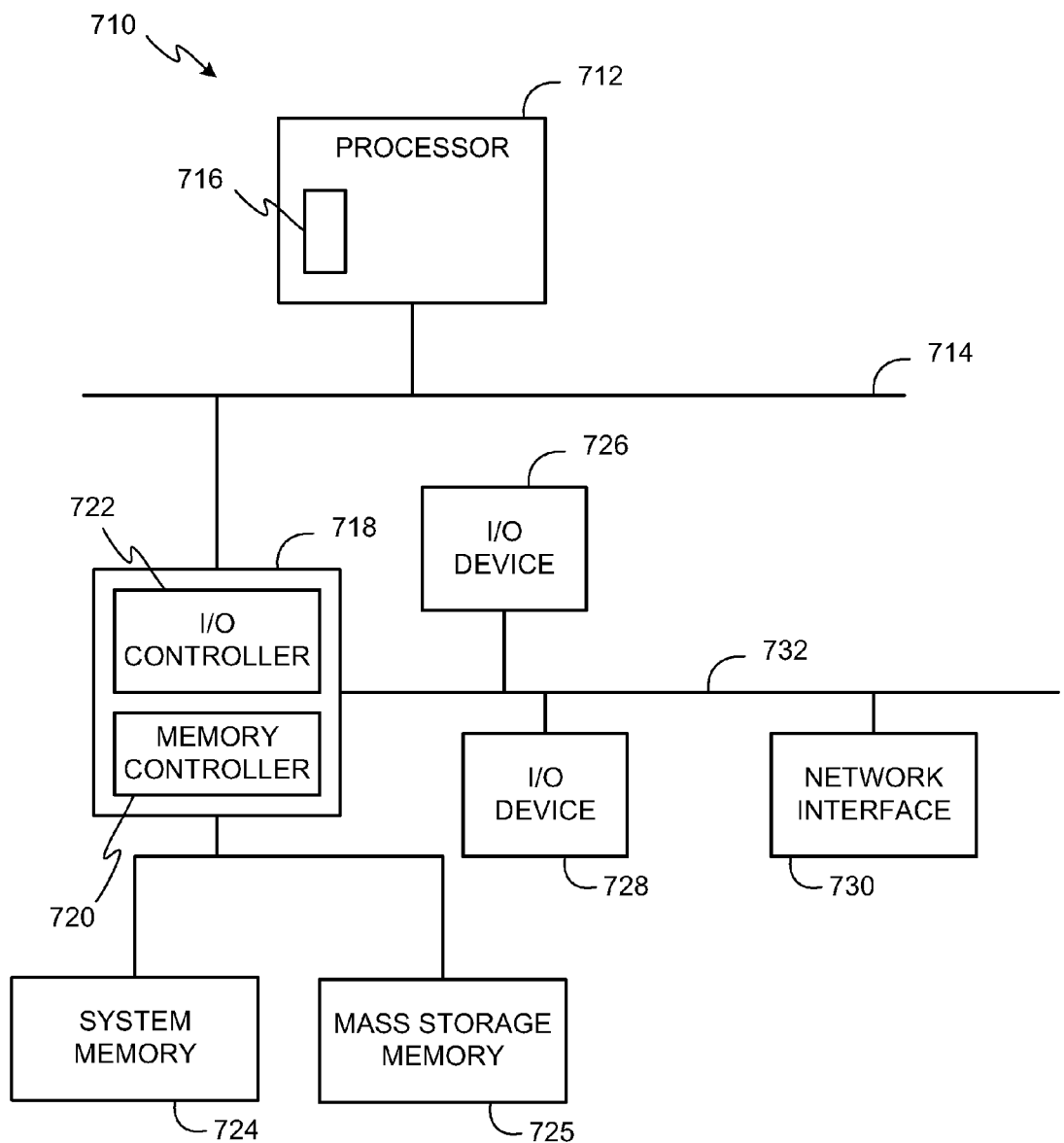
FIG. 7 is a block diagram of an example processor system that may be used to implement the example systems and methods described herein.

FIG. 7 is a block diagram of an example processor system 710 that may be used to implement the example apparatus, methods, and articles of manufacture described herein. As shown in FIG. 7, the processor system 710 includes a processor 712 that is coupled to an interconnection bus 714. The processor 712 includes a register set or register space 716, which is depicted in FIG. 7 as being entirely on-chip, but which could alternatively be located entirely or partially off-chip and directly coupled to the processor 712 via dedicated electrical connections and/or via the interconnection bus 714. The processor 712 may be any suitable processor, processing unit or microprocessor. Although not shown in FIG. 7, the system 710 may be a multi-processor system and, thus, may include one or more additional processors that are identical or similar to the processor 712 and that are communicatively coupled to the interconnection bus 714.

The processor 712 of FIG. 7 is coupled to a chipset 718, which includes a memory controller 720 and an input/output ("I/O") controller 722. As is well known, a chipset typically provides I/O and memory management functions as well as a plurality of general purpose and/or special purpose registers, timers, etc. that are accessible or used by one or more processors coupled to the chipset 718. The memory controller 720 performs functions that enable the processor 712 (or processors if there are multiple processors) to access a system memory 724 and a mass storage memory 725.

The system memory 724 may include any desired type of volatile and/or non-volatile memory such as, for example, static random access memory ("SRAM"), dynamic random access memory ("DRAM"), flash memory, read-only memory ("ROM"), etc. The mass storage memory 725 may include any desired type of mass storage device including hard disk drives, optical drives, tape storage devices, etc.

The I/O controller 722 performs functions that enable the processor 712 to communicate with peripheral input/output ("I/O") devices 726 and 728 and a network interface 730 via an I/O bus 732. The I/O devices 726 and 728 may be any desired type of I/O device such as, for example, a keyboard, a video display or monitor, a mouse, etc. The network interface 730 may be, for example, an Ethernet device, an asynchronous transfer mode ("ATM") device, an 802.11 device, a DSL modem, a cable modem, a cellular modem, etc. that enables the processor system 710 to communicate with another processor system.

While the memory controller 720 and the I/O controller 722 are depicted in FIG. 7 as separate functional blocks within the chipset 718, the functions performed by these blocks may be integrated within a single semiconductor circuit or may be implemented using two or more separate integrated circuits.

Using example systems and methods described herein, a risk associated with process control system software upgrades/updates can be reduced by examining a user's process control system before the system upgrade/update begins. Each hardware device in a user's process control system can be examined to determine if any of the devices will have problems, changed behavior, or new functionality between the currently installed revision (e.g., the departure point) and the new software revision that should be reported to the user before the system upgrade/update begins. Each software component in a user's process control system can be examined to determine if any of the software components will have problems, changed behavior, or new functionality between the currently installed revision (e.g., departure point) and the new revision that should be reported to the user before the system upgrade/update begins. Each process control algorithm in a user's process control system can be examined to determine if any of the control algorithms will have problems, changed behavior, or new functionality between the currently installed revision (e.g., departure point) and the new revision that should be reported to the user before the system upgrade/update begins. Known issues in the software revision to be installed can be presented to the user before the system upgrade/update begins. Known issues between the user's departure point and the software revision to be installed can be presented to the user before the system upgrade/update begins. Workarounds or fixes to known issues can be presented to the user before the system upgrade/update begins. New functionality added in the software revision to be installed can be presented to the user before the system upgrade/update begins. Examples of how the new functionality may be used in the user's system can be presented to the user before the system upgrade/update begins. Changed functionality between the currently installed software revision and the software revision to be installed can be presented to the user before the system upgrade/update begins. A description of how the changed functionality affects a user's system can be presented to the user before the system upgrade/update begins. Customized release notes or "readme" items of interest, based on customer configuration, can be presented to the user before the software system upgrade/update begins. Customized release notes or "readme" items of interest, based on customer departure point, can be presented to the user before the software system upgrade/update begins.

Users can manually hide areas within the release notes that may not be of interest to a particular area. Users can manually show areas within the release notes that may have been initially hidden due to the current configuration if new software items or hardware may be installed in the future. Hot fixes for an installed process control system can be recommended by hardware in use in the system. Hot fixes for an installed process control system can be recommended by software components in use in the system. Hot fixes for an installed process control system can be recommended by control strategy algorithms in use in the system.

Certain examples contemplate methods, systems and computer program products on any machine-readable media to implement functionality described above. Certain examples may be implemented using an existing computer processor, or by a special purpose computer processor incorporated for this or another purpose or by a hardwired and/or firmware system, for example.

Certain examples include computer-readable media for carrying or having computer-executable instructions or data structures stored thereon. Such computer-readable media may be any available media that may be accessed by a general purpose or special purpose computer or other machine with a processor. By way of example, such computer-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of computer-executable instructions or data structures and which can be accessed by a general purpose or special purpose computer or other machine with a processor. Combinations of the above are also included within the scope of computer-readable media. Computer-executable instructions comprise, for example, instructions and data which cause a general purpose computer, special purpose computer, or special purpose processing machines to perform a certain function or group of functions.

Generally, computer-executable instructions include routines, programs, objects, components, data structures, etc., that perform particular tasks or implement particular abstract data types. Computer-executable instructions, associated data structures, and program modules represent examples of program code for executing steps of certain methods and systems disclosed herein. The particular sequence of such executable instructions or associated data structures represent examples of corresponding acts for implementing the functions described in such operations.

Examples may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated computer-readable media provide nonvolatile storage of computer-executable instructions, data structures, program modules and other data for the computer.

While the foregoing disclosure has provided certain examples, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims, either literally or under the doctrine of equivalents.

What is claimed is:

1. A method for customizing documentation for software updates or upgrades for a process control system, comprising:
   compiling general release notes for at least one of an update or an upgrade of a process control system;
   instrumenting the general release notes to correlate the release notes with a general process control system to produce instrumented notes;
   providing a predictive assessment of risk associated with the at least one of an update or an upgrade for a particular process control system in advance of installation of the at least one of an update or an upgrade on the particular process control system by matching configuration information for the particular process control system with the instrumented notes to filter the instrumented notes, associate a risk in the instrumented notes for the at least one of an update or an upgrade with a corresponding component of the particular process control system, and produce customized notes for the particular process control system; and
   providing the customized notes to a user of the particular process control system in conjunction with the at least one of an update or an upgrade to alert the user regarding potential effects of the at least one of an update or an upgrade on the particular process control system.

2. A method as defined in claim 1, further comprising compiling knowledge base articles and instrumenting the knowledge base articles with the general release notes to produce the instrumented notes.

3. A method as defined in claim 1, wherein the configuration information comprises user configuration information, installed third party application information, and current software version information.

4. A method as defined in claim 1, further comprising filtering the customized notes based on manual user refinement.

5. A method as defined in claim 1, further comprising transmitting at least one of an update or an upgrade for a process control system with the instrumented notes.

6. A method as defined in claim 5, further comprising matching the configuration information for the particular process control system with the instrumented notes to filter the instrumented notes and produce customized notes for the particular process control system upon initiation of installation of the at least one of an update or an upgrade at the particular process control system.

7. A method as defined in claim 1, wherein providing further comprises generating a graphical user interface wizard to guide the user through installation of the at least one of an update or an upgrade and review of the customized notes at the particular process control system.

8. A customized documentation generation apparatus for generating documents relevant to a software update or upgrade of a particular process control system, comprising:
a processor configured to implement:
a notes instrumentation module instrumenting general release notes for at least one of an update or an upgrade of a process control system to correlate the release notes with a general process control system configuration to produce instrumented notes;
an upgrade assessment module providing a predictive assessment of risk associated with the at least one of an update or an upgrade for a particular process control system in advance of installation of the at least one of an update or an upgrade on the particular process control system by determining configuration information for a particular process control system to provide default filter settings; and
an items of interest filter applying the default filter settings for the particular process control system to the instrumented notes to filter the instrumented notes, associate a risk in the instrumented notes for the at least one of an update or an upgrade with a corresponding component of the particular process control system, and produce custom release notes for the particular process control system, the items of interest filter providing the custom release notes to a user of the particular process control system in conjunction with the at least one of an update or an upgrade to alert the user regarding potential effects of the at least one of an update or an upgrade on the particular process control system.

9. An apparatus as defined in claim 8, wherein the notes instrumentation module instruments one or more knowledge base articles with the general release notes to produce the instrumented notes.

10. An apparatus as defined in claim 8, wherein the configuration information comprises user configuration information, installed third party application information, and current software version information.

11. An apparatus as defined in claim 8, further comprising custom filter settings provided by a user for the particular process control system, the items of interest filter applying the custom filter settings to the instrumented notes in conjunction with the default filter settings to produce custom release notes for the particular process control system.

12. An apparatus as defined in claim 11, wherein the items of interest filter modifies the default filter settings based on the custom filter settings and filters the instrumented notes to produce custom release notes for the particular process control system.

13. An apparatus as defined in claim 8, wherein the notes instrumentation module transmits the at least one of an update or an upgrade for a process control system to a user of the particular process control system along with the instrumented notes.

14. An apparatus as defined in claim 13, wherein the items of interest filter filters the instrumented notes based on the default filter settings for the particular process control system to produce customized notes for the particular process control system upon initiation of installation of the at least one of an update or an upgrade at the particular process control system.

15. An apparatus as defined in claim 8, further comprising a graphical user interface wizard guiding the user through installation of the at least one of an update or an upgrade and review of the customized notes at the particular process control system.

16. A graphical user interface wizard gathering master release notes and knowledge base articles related to at least one of a process control system software update or a process control system software upgrade, transforming the master release notes and knowledge base articles into custom release notes for a particular process control system implementation, and providing the custom release notes for user review, the graphical user interface wizard comprising a processor to implement:
a notes instrumentation module instrumenting the master release notes and knowledge base articles relating to the at least one of a process control system software update or a process control system software upgrade to correlate the mater release notes with a general process control system configuration to produce instrumented notes;
an upgrade assessment module providing a predictive assessment of risk associated with the at least one of an update or an upgrade for a particular process control system in advance of installation of the at least one of an update or an upgrade on the particular process control system by determining configuration information for the particular process control system implementation to provide default filter settings; and
an items of interest filter applying the default filter settings for the particular process control system implementation to the instrumented notes to filter the instrumented notes, associate a risk in the instrumented notes for the at least one of an update or an upgrade with a corresponding component of the particular process control system, and produce custom release notes for the particular process control system, the items of interest filter providing the custom release notes to a user of the particular process control system in conjunction with the at least one of a process control system software update or a process control system software upgrade to alert the user regarding potential effects of the at least one of a process control system software update or a process control system software upgrade on the particular process control system.

17. A graphical user interface wizard as defined in claim 16, wherein the configuration information comprises user configuration information, installed third party application information, and current software version information.

18. A graphical user interface wizard as defined in claim 16, further comprising custom filter settings provided by a user for the particular process control system, the items of interest filter applying the custom filter settings to the instrumented notes in conjunction with the default filter settings to produce custom release notes for the particular process control system implementation.

19. A graphical user interface wizard as defined in claim 16, wherein the items of interest filter modifies the default filter settings based on the custom filter settings and filters the instrumented notes to produce custom release notes for the particular process control system implementation.

20. A graphical user interface wizard as defined in claim 16, wherein the items of interest filter filters the instrumented notes based on the default filter settings for the particular process control system to produce customized notes for the particular process control system implementation upon initiation of installation of the at least one of a process control system software update or a process control system software upgrade at the particular process control system.

21. A machine accessible medium having instructions stored thereon that, when executed, cause a machine to:

compile general release notes for at least one of an update or an upgrade of a process control system;

instrument the general release notes to correlate the release notes with a general process control system to produce instrumented notes;

provide a predictive assessment of risk associated with the at least one of an update or an upgrade for a particular process control system in advance of installation of the at least one of an update or an upgrade on the particular process control system by matching configuration information for the particular process control system with the instrumented notes to filter the instrumented notes, associate a risk in the instrumented notes for the at least one of an update or an upgrade with a corresponding component of the particular process control system, and produce customized notes for the particular process control system; and provide the customized notes to a user of the particular process control system in conjunction with the at least one of an update or an upgrade to alert the user regarding potential effects of the at least one of an update or an upgrade on the particular process control system.

22. A machine accessible medium as defined in claim 21, further comprising instructions that, when executed filtering the customized notes based on manual user refinement.

23. A machine accessible medium as defined in claim 21, further comprising instructions that, when executed, generate a graphical user interface wizard to guide the user through installation of the at least one of an update or an upgrade and review of the customized notes at the particular process control system.

* * * * *